(12) United States Patent
Shen et al.

(10) Patent No.: US 12,211,269 B2
(45) Date of Patent: Jan. 28, 2025

(54) TIME-LINE BASED OBJECT TRACKING ANNOTATION

(71) Applicant: Waymo LLC, Mountain View, CA (US)

(72) Inventors: Yulai Shen, Sunnyvale, CA (US); Henrik Kretzschmar, Mountain View, CA (US); Jeffrey Sham, San Jose, CA (US); Jeffrey Carlson, Mountain View, CA (US); Lo Po Tsui, Mountain View, CA (US); Dragomir Anguelov, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 608 days.

(21) Appl. No.: 17/314,925

(22) Filed: May 7, 2021

(65) Prior Publication Data

US 2022/0358314 A1    Nov. 10, 2022

(51) Int. Cl.
*G06V 20/20* (2022.01)
*G06N 20/00* (2019.01)
(Continued)

(52) U.S. Cl.
CPC ............ *G06V 20/20* (2022.01); *G06N 20/00* (2019.01); *G06V 10/255* (2022.01); *G06V 20/49* (2022.01)

(58) Field of Classification Search
CPC ...... G06V 20/20; G06V 10/255; G06V 20/49; G06V 10/7788; G06V 10/62; G06V 20/41;
(Continued)

(56) References Cited

U.S. PATENT DOCUMENTS 6,295,367 B1 * 9/2001 Crabtree ................. G06T 7/246
    382/103
8,677,242 B2 * 3/2014 Berry ..................... G11B 27/34
    715/721
(Continued)

OTHER PUBLICATIONS

B. Marcotegui et al., "A video object generation tool allowing friendly user interaction," Proceedings 1999 International Conference on Image Processing (Cat. 99CH36348), Kobe, Japan, 1999, pp. 391-395 vol. 2, doi: 10.1109/ICIP.1999.822924 (Year: 1999).*
(Continued)

*Primary Examiner* — Sumati Lefkowitz
*Assistant Examiner* — Aaron Joseph Sorrin
(74) *Attorney, Agent, or Firm* — Fish & Richardson P.C.

(57) ABSTRACT

Methods, computer systems, and apparatus, including computer programs encoded on computer storage media, for generating and editing object track labels for objects detected in video data. One of the methods includes obtaining a video segment comprising multiple image frames associated with multiple time points; obtaining object track data specifying a set of object tracks; providing, for presentation to a user, a user interface for modifying the object track data, the user interface displaying object timeline representations of the object tracks; receiving one or more user inputs that indicate one or more modifications to the object timeline representations; updating the object timeline representations displayed in the timeline display area; and updating the object track data according to the updated object timeline representations.

18 Claims, 5 Drawing Sheets

(51) Int. Cl.
*G06V 10/20* (2022.01)
*G06V 20/40* (2022.01)
(58) Field of Classification Search
CPC .................. G06N 20/00; G06T 7/246; G06T 2207/10016; G06T 2207/20081; G06T 2207/30241; G06T 2207/30252
See application file for complete search history.

(56) References Cited

U.S. PATENT DOCUMENTS

| | | | | |
|---|---|---|---|---|
| 9,773,525 | B2* | 9/2017 | Lettau | G11B 27/34 |
| 10,452,913 | B1* | 10/2019 | Cervelli | G06T 7/20 |
| 10,979,761 | B2* | 4/2021 | Sekar | H04N 21/23418 |
| 11,018,884 | B2* | 5/2021 | Faulkner | H04N 7/155 |
| 2006/0088191 | A1* | 4/2006 | Zhang | G06V 20/40 |
| | | | | 382/103 |
| 2008/0253735 | A1* | 10/2008 | Kuspa | G11B 27/34 |
| | | | | 386/282 |
| 2012/0062732 | A1* | 3/2012 | Marman | G08B 13/19682 |
| | | | | 348/142 |
| 2014/0258867 | A1* | 9/2014 | Yang | G06F 3/0484 |
| | | | | 715/723 |
| 2017/0124399 | A1* | 5/2017 | Bostick | G11B 27/34 |
| 2018/0295428 | A1* | 10/2018 | Bi | H04N 21/8153 |
| 2022/0263877 | A1* | 8/2022 | Conlin | H04L 65/765 |

OTHER PUBLICATIONS

A. G. A. Perera, C. Srinivas, A. Hoogs, G. Brooksby and Wensheng Hu, "Multi-Object Tracking Through Simultaneous Long Occlusions and Split-Merge Conditions," 2006 IEEE Computer Society Conference on Computer Vision and Pattern Recognition (CVPR'06), New York, NY, USA, 2006 (Year: 2006).*

Sulaiman, S., et al. "Graphical user interface (GUI) development for object tracking system in video sequences." World Applied Sciences Journal 4.2 (2008): 244-249. (Year: 2008).*

I. Kavasidis, et al. 2012. A semi-automatic tool for detection and tracking ground truth generation in videos. In Proceedings of the 1st International Workshop on Visual Interfaces for Ground Truth Collection in Computer Vision Applications (VIGTA '12). (Year: 2012).*

T. D'Orazio, M. Leo, N. Mosca, P. Spagnolo and P. L. Mazzeo, "A Semi-automatic System for Ground Truth Generation of Soccer Video Sequences," 2009 Sixth IEEE International Conference on Advanced Video and Signal Based Surveillance, Genova, Italy, 2009, pp. 559-564, doi: 10.1109/AVSS.2009.69. (Year: 2009).*

Joosung Kim, Ryu-Hyeok Gwon, Jin-Tak Park, Hakil Kim, and Yoo-Sung Kim. 2013. A Semi-Automatic Video Annotation Tool to Generate Ground Truth for Intelligent Video Surveillance Systems. In Proceedings of International Conference on Advances in Mobile Computing Multimedia (MoMM '13). (Year: 2013).*

Simone Bianco, Gianluigi Ciocca, Paolo Napoletano, Raimondo Schettini, An interactive tool for manual, semi-automatic and automatic video annotation, Computer Vision and Image Understanding, vol. 131, 2015, pp. 88-99 (Year: 2015).*

Bianco et al., "An interactive tool for manual, semi-automatic and automatic video annotation," Computer Vision and Image Understanding, Dec. 2014, 131:88-99.

Extended European Search Report in European Appln. No. 22168053. 1, Sep. 19, 2022, 8 pages.

Ritter et al., "Rapid Model-Driven Annotation and Evaluation for Object Detection in Videos," UAHCI 2015, Jul. 2015, 9175:464-474.

U.S. Appl. No. 17/099,634, filed Nov. 16, 2020.

Hung et al., "SoDA: Multi-object tracking with soft data association," CoRR, Aug. 2020, arxiv.org/abs/2008.07725, 13 pages.

* cited by examiner

TIME-LINE BASED OBJECT TRACKING ANNOTATION

BACKGROUND

This specification generally relates to generating and modifying object track labels for video data.

Tracking objects over time in an environment is required for many tasks, such as robotic control, autonomous vehicle motion planning, and so on. However, training and testing machine learning models to effectively track objects in an environment require large-scale datasets of sensor data and corresponding object track labels.

SUMMARY

Machine learning models designed to automatically track the movements of objects in an environment are critical in many applications, such as robotic control and autonomous vehicle motion planning. Training and testing those machine learning models requires training examples of sensor data and corresponding object track labels. For example, large-scale datasets of vehicle sensor data and high-quality annotations of object tracks are crucial for training object detectors and classifiers in autonomous driving research and development. Manually annotating sensor data can be time-consuming and expensive. This specification provides a system and associated methods for improving the efficiency of generating reliable object track labels from video data.

In one aspect of the specification, a method is provided for generating and editing object track labels for objects detected in video data. The method can be implemented by a system of one or more computers located in one or more locations. The system obtains a data set including a video segment and object track data specifying a set of object tracks. The video segment includes multiple image frames associated with multiple time points. Each object track labels a different detected object in the video segment by specifying one or more object labels in one or more of the image frames. Each object label marks a position and a geometry of the corresponding detected object in one of the multiple image frames. In some implementations, each object label can include a bounding box for marking the position and the geometry of the corresponding detected object.

The system further provides a user interface for modifying the object track data. The user interface displays the video segment, and further displays a set of timeline representations for the respective object tracks. Each object timeline representation identifies the image frames in which the corresponding detected object is marked with a bounding box in the object track. The system receives user inputs that indicate modifications to the object timeline representations, and updates the displayed object timeline representations according to the user indicated modifications. After receiving user confirmation of the updated object timeline representations, the system updates the respective object tracks in the data set according to the updated object timeline representations.

In general, the described system and associated methods provide a solution for efficiently generating, reviewing, editing, and confirming object track labels in video data. The object track labels define multiple moving objects detected in a scene, as well as each of their individual tracks across time. This type of annotation is critical for developing and testing algorithms for interpreting sensor data of self-driving vehicles.

Traditionally, the object track labels are created and entered into a computer system by human operators through a user interface (UI). The manual annotation is time-consuming and expensive. Some computer-implemented systems can automatically generate candidate object tracks. However, these candidate tracks are prone to errors and are not of adequate quality to be used as training data for a new machine learning model. The system and associated method described in this specification provides a UI that allows operators to effectively interact with a set of automatically-generated candidate object tracks, including refining the automatically generated object tracks by making verifications and modifications. This approach can significantly reduce the latency and cost for video object track labeling while providing high-quality object track labels.

The described system generates and operates on object timeline representations of object track labels, allowing a user to make timeline-based modifications to the object track labels, including splitting, trimming, merging, or deleting object tracks. This feature enables higher labeling productivity, since the user can use the system to manipulate video segments containing sequences of image frames having object labels in a batch manner, instead of having to make modifications in each individual image frame.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Tracking objects over time in an environment is required for many tasks, such as robotic control, autonomous vehicle motion planning, and so on. Training and testing machine learning models to effectively track objects in an environment requires training data including sensor data and corresponding object track labels. For example, large-scale datasets of vehicle sensor data and high-quality ground-truth labels of tracked objects in the sensor data are needed for developing and testing algorithms for interpreting sensor data of self-driving vehicles.

Traditionally, the object track labels are created and entered into a computer system by human operators through a user interface. The manual annotation is time-consuming and expensive. This specification provides a system and associated methods for improving the efficiency of generating reliable object track labels for video data. The provided system provides an improved user interface that allows a user to efficiently verify and make modifications to object track labels automatically generated by a computer-implemented system.

In some implementations, the provided system utilizes candidate object track annotations initialized by an automated annotation generation system. As opposed to annotating scenes from scratch, the provided system allows operators to refine the automatically generated object tracks by making verifications and modifications. This approach can significantly reduce the latency and cost of video object track labeling.

Although the candidate object tracks generated by the automated annotation generation system can be used as a starting point, these candidate tracks are prone to errors and are not of adequate quality to be used as training data for a new machine learning model. For example, in a busy scene having multiple moving and sometimes overlapping objects, an object track generated by the automated annotation generation system can jump from tracking one actual object to tracking another actual object. Thus, the user needs to refine the object tracks generated by the automated annotation generation system to improve their accuracy.

A feature of the provided system is that the system generates and operates on object timeline representations of object track labels, allowing a user to make timeline-based modifications to the object track labels, including splitting, trimming, merging, or deleting object tracks. This feature enables higher labeling productivity, since the user can use the system to manipulate video segments containing sequences of multiple image frames having object labels and update object labels in the multiple image frames via a single operation, instead of having to make modifications in each individual image frame.

Figure 1:
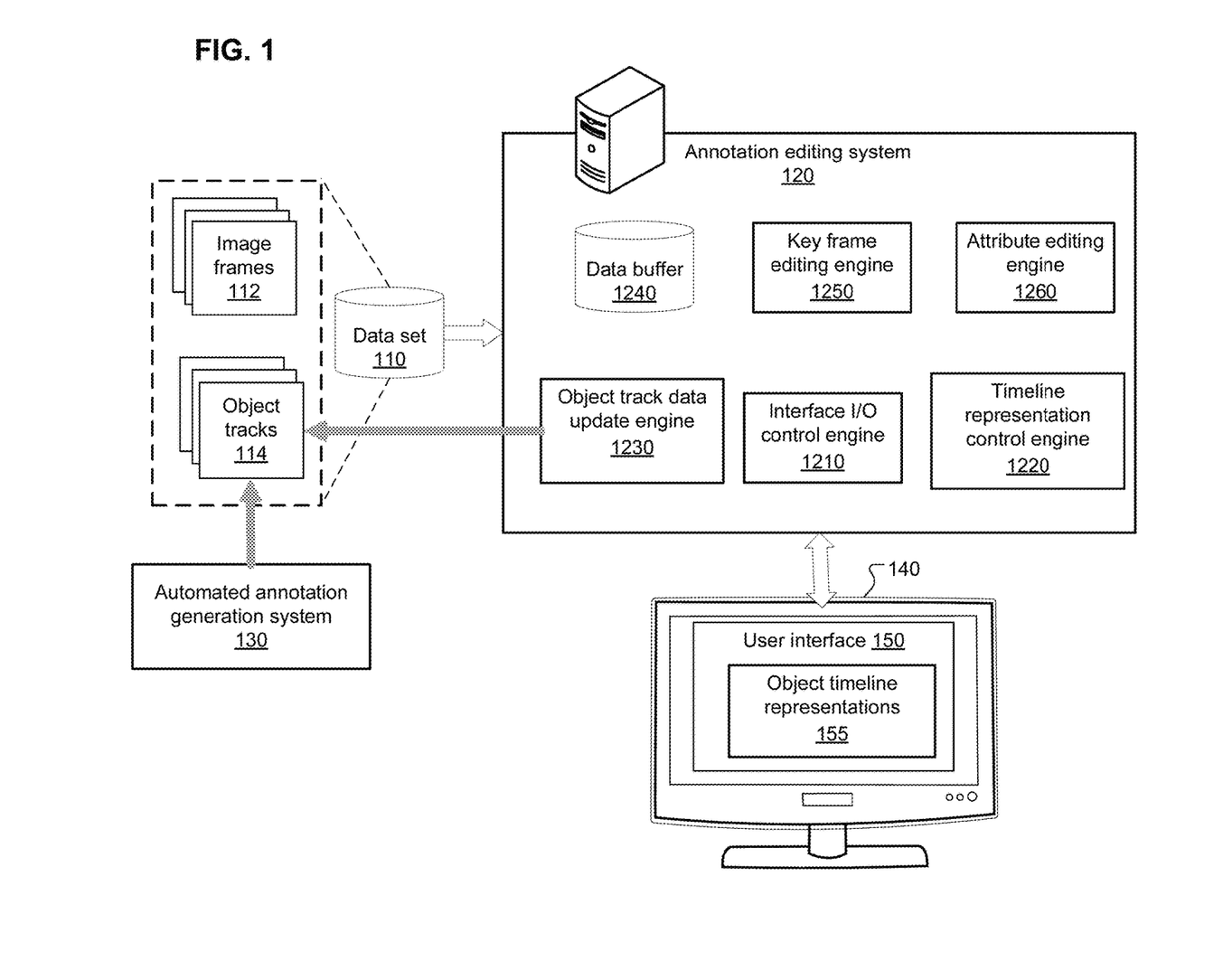
FIG. 1 shows an example annotation editing system.

FIG. 1 shows an example of an annotation editing system 120. The system 120 is an example of a system implemented as computer programs on one or more computers in one or more locations, in which the systems, components, and techniques described below can be implemented.

In general, the annotation editing system 120 obtains a data set including a video segment and object track data specifying a set of object tracks. The video segment includes multiple image frames associated with multiple time points, i.e., with each image frame being associated with a different respective time point. Each object track labels a different detected object in the video segment by specifying one or more bounding boxes in one or more of the image frames. Each bounding box marks a position and a geometry of the corresponding detected object in one of the multiple image frames.

The system 120 further provides a user interface for modifying the object track data. The user interface displays image frames from the video segment, and further displays a set of timeline representations, with each timeline representation corresponding to a respective one of the object tracks. Each object timeline representation identifies the image frames in which the corresponding detected object is marked with a bounding box in the object track.

The system 120 receives user inputs, i.e., user interactions submitted through the user interface, which indicate modifications to the object timeline representations, and updates the displayed object timeline representations according to the user indicated modifications.

After receiving user confirmation of the updated object timeline representations, the system 120 updates the respective object tracks in the data set according to the updated object timeline representations.

As shown in FIG. 1, the annotation editing system 120 obtains a data set 110 that includes multiple image frames 112 of a video segment and object track data specifying a set of object tracks 114. Each object track 114 corresponds to a different detected object in the image frames and specifies one or more bounding boxes for the corresponding detected object.

The system 120 includes an interface I/O control engine 1210 that generates and controls a user interface 150 displayed on a display device 140, an object timeline representation control engine 1220 that displays and edits object timeline representations 155 of the respective object tracks 114 in response to user inputs submitted through the user interface 150, an object track data update engine 1230 that updates the object tracks 114 according to updated object timeline representations 155, and a data buffer 1240 that stores modifications made to the object timeline representations 155 in a current session.

As an example, the video segment can be generated by vehicle sensors (e.g., a camera mounted on a vehicle) as the vehicle navigates through a real-world environment.

In some implementations, the object tracks 114 are first generated by an automated annotation generation system 130.

The automated annotation system 130 detects objects, such as vehicles, pedestrians, and cyclists, in the image frames and marks the detected objects using bounding boxes. Each bounding box can be a rectangle that marks a position and a geometry of the corresponding detected object in one of the multiple image frames.

The module 130 further organizes the bounding boxes into the object tracks. Each object track includes bounding boxes that have been classified as marking the same object detected in the video segment.

The module 130 can include an object detection model that detects objects in the image frames of the video segment and a multi-object tracking model that generates the object tracks.

In one example, the multi-object tracking model generates aggregated features of the detected objects by encoding spatiotemporal context information of each detected object with self-attention layers, and generates the object tracks based on the aggregated features. The example process is described in more details in non-patent literature "SoDA: Multi-object tracking with soft data association" Hung et al. in arXiv: 2008.07725 (cs.CV), August, 2020, and is further described in U.S. patent application Ser. No. 17/099,634, filed on Nov. 16, 2020, the contents of which are incorporated in this specification by reference.

In some implementations, the object track data for an object track further includes attributes of the detected object. The attributes can include object-level properties, such as the type of objects, including options such as "passenger car", "police car", "pedestrian", "motorcyclist", "police motorcyclist", "ambulance", "fire truck", "cyclist", "open car door", "vehicle attachment", and so on. The attributes can also include frame-level properties, such as an occlusion property of the detected object in a specific frame, including options such as "fully occluded" when the object is fully occluded by other objects in the image frame, "partially occluded" when the object is partially occluded by other objects in the image frame, and "not occluded" when the object is fully visible in the image frame.

In some implementations, only a subset of image frames of the video segment are annotated with bounding boxes in the object track data. This subset of image frames are termed key frames.

The system 120 can generate annotations for the non-key image frames based on the key frames using interpolation or another prediction or approximation method. Thus, a user does not have to label or modify bounding boxes for every frame of every object in the video segment for generating or editing the object track data.

The interface I/O control engine 1210 generates the user interface 150 for presenting the video segment and the object track data, and allowing a user to modify the object track data. The system 120 can output the user interface 150 to a display device 140 that displays the user interface 150 as a graphical user interface (GUI). The system 120 outputs the user interface 150 to the display device 140 through a data communication link, e.g., via I/O cable connections, a local network, or the internet. The display device 140 can be a computer monitor or a computer, e.g., a mobile device, a laptop computer, a desktop computer, and so on.

A particular example of the user interface will be described below with reference to FIG. 2. In general, the user interface 150 can include a video display area that displays one or more image frames of the video segment annotated with any bounding boxes specified in the object track data. The user interface further includes a timeline display area that displays, for each of one or more of the object tracks, an object timeline representation 155 of the object track 114 that identifies the image frames in which the corresponding detected object is marked with a bounding box.

The interface I/O control engine 1210 also receives and recognizes user interactions with the user interface. The user interactions can indicate modifications to be made to one or more of the object timeline representations 155.

In general, the user can interact with the system 120 through the interface 150 using an input device. Examples of the input device include a keyboard, a mouse or a trackball, a touchpad, a touch screen, a microphone for receiving voice commands, a visual sensor for receiving gesture commands, and so on. The input device can receive the user inputs and send the user to the system 120.

Examples of user interactions with the user interface for modifying object timeline representations will be described below with reference to FIG. 3A and FIG. 3B. In general, the modifications made to an object timeline representation 155 specify modifications to be made to the corresponding object tract, and include, for example, splitting an object track, trimming an object track, merging multiple object tracks, and splitting and swapping sections of multiple object tracks.

In some implementations, in response to a modification being made to an object timeline representation, the system 120 can automatically update the display of the bounding box annotations in the video display area, so the displayed bounding box annotations are consistent with the updated object timeline representations.

In some implementations, the system 120 further includes a key frame editing engine 1250 that makes modifications to the object track data based on user inputs in a key frame editing mode. In the key frame editing mode, the system 120 receives user inputs that indicate modifications to the bounding boxes in individual key frames. The modifications can include resizing or repositioning of one or more bounding boxes in one or more individual key frames.

In some implementations, the system 120 further includes an attribute editing engine 1260 that makes modifications to object attributes in the track data based on user inputs in an attribute editing mode. In the attribute editing mode, the system 120 can receive user inputs that indicate modifications to the object-level properties (e.g., the type of objects) or the frame-level properties (e.g., occlusion properties) of the bounding boxes.

The object track data update engine 1230 updates the object track data according to the updated object timeline representation. For example, after a specific object timeline representation has been trimmed, the object track data update engine 1230 can modify the corresponding object track 114 by removing, from the corresponding object track, the bounding boxes that have been removed from the object timeline representation. Similarly, after a first and a second object timeline representations have been merged, the system can modify the object tract corresponding to the first object timeline representation by inserting, into the object tract corresponding to the first object timeline representation, the bounding boxes that have been inserted to the first object timeline representation by the merging operation, and remove the object track corresponding to the second object timeline representation from the object tract data. The updated object track data is stored in a storage device, and can undergo further review and revisions, or be used as data labels in training examples for training or testing one or more machine learning algorithms for object tracking.

In some implementations, the system includes a data buffer 1240 that stores the modifications made to the object timeline representations. The data buffer stores the modifications made to the object timeline representations in a current session, and provides the flexibility for a user to toggle on and off the modifications made in the current session. The system 120 can receive user confirmation and verification of the modifications before updating the object track data.

While this specification describes the object labels as being bounding boxes, other types of object labels that mark the position and geometry of an object in an image frame can be used instead. One example of another type of object label, is a set of key points. The key points can be spatial locations, or points in the image frame that mark features (e.g., a corner or a point on the outer boundary) of the object in the image frame.

Figure 2:
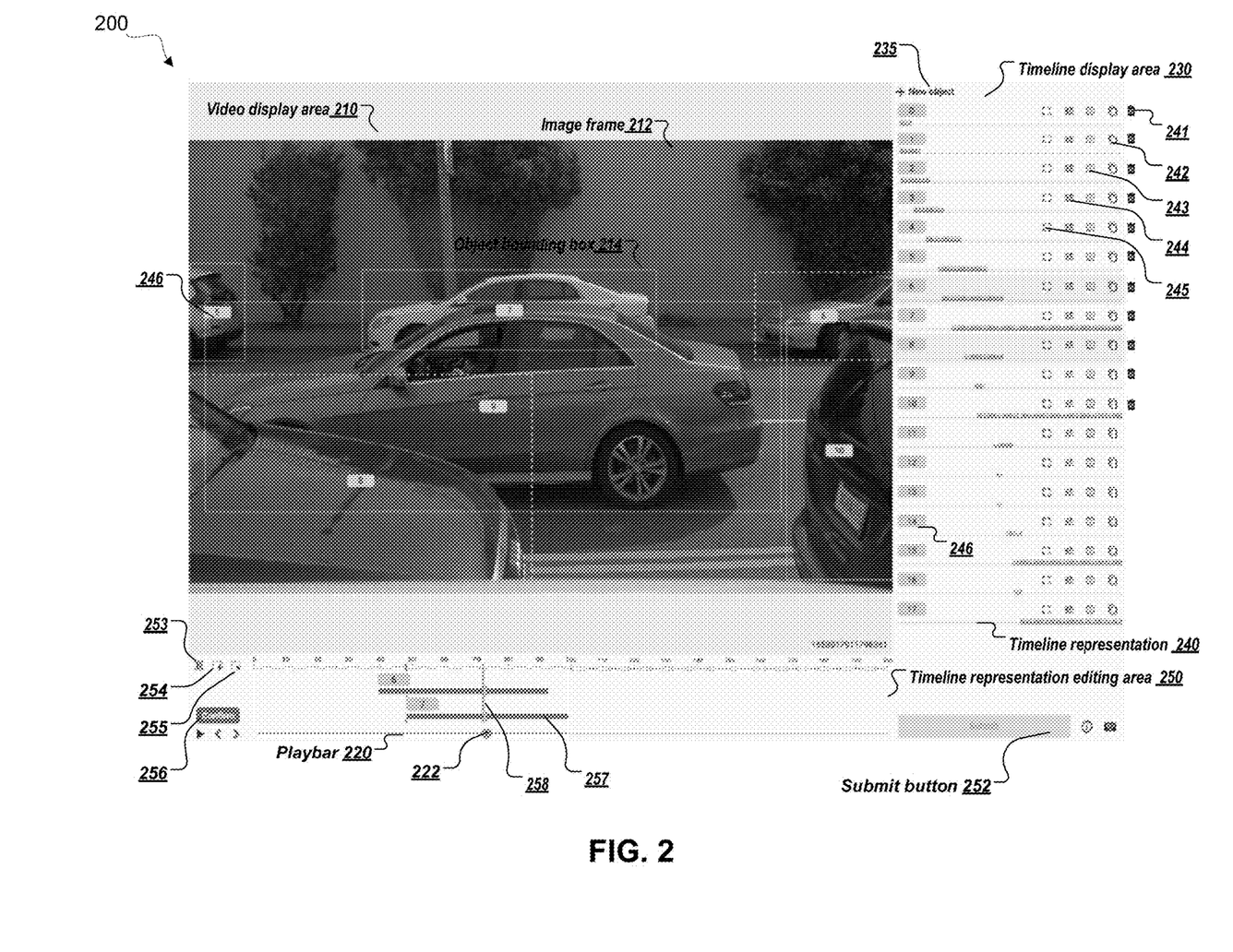
FIG. 2 shows an example of a user interface generated by the annotation editing system.

FIG. 2 shows an example of the user interface 200 generated by the annotation editing system 120. The user interface 200 includes a video display area 210 for displaying image frames 212 of the video segment, a playbar 220 for controlling the navigation of the frames of the video segment, and a timeline display area 230 for displaying a set of object timeline representations.

The playbar 220 includes control buttons to play/pause, fast forward, and fast rewind the video segment. The playbar 220 also includes a frame cursor control 222 to allow a user to scrub the video segment to a particular image frame. When the video display area 210 is displaying a key frame of the video segment, the interface 210 overlays the bounding boxes 214 in the key frame on top of the displayed image frame to mark the detected objects (e.g., vehicles) in the image frame. The video display area 210 can also display a track number 246 for each displayed bounding box 214, identifying the object track associated with the bounding box.

The timeline display area 230 displays the set of object timeline representations 240 corresponding to the set of object tracks in the object track data. The track number 246 identifying the object track is also displayed next to each timeline representation to identify the corresponding object tract. The example shown in FIG. 2 has 18 object timeline representations for 18 object tracks, with track numbers ranging from 0-17.

For each object timeline representation 240 shown in the example of FIG. 2, the object timeline representation 240 includes a timeline axis (i.e. the horizontal axis) for relative positions of time points or image frame numbers in the video segment. The object timeline representation 240 marks, along the horizontal axis, the timeline positions of the image frames in which the corresponding detected object is annotated by a bounding box. For example, the object timeline representation 240 marks those image frames having the bounding box annotations of the detected object by the short vertical lines along the horizontal axis. Thus, the object timeline representations 240 provide a summarized view of the object tracks in the input data. The track numbers 246 displayed with the object timeline representations 240 in the timeline display 230 and with the object bounding boxes 214 in the image frames 212 provide a visual association between the detected objects and the object timeline representations of the object tracks.

For user convenience, the object timeline representation 240 allows user interactions to zoom in, zoom out, or pan the timeline axis. The object timeline representation 240 further allows user interaction for navigating the video segment. For example, the interface can receive a user input indicating a hover location over a timeline axis of an object timeline representation 240 to seek the corresponding image frames in the video segment. In response to receiving a user input that specify a location over the timeline axis of an object timeline representation 240, the interface changes the position of the time cursor control 222 to scrub the video segment to the corresponding image frame.

The timeline display area 230 also displays various editing options for each object timeline representation 240. In particular, the interface presents a plurality of editing controls, for example, as clickable buttons displayed under each object timeline representation 240. The editing controls include a key frame editing mode control 245 to enter a key frame editing mode to allow further user inputs to edit the bounding boxes 214 in the object track, a debug information control 242 to provide debug information, a track editing mode control 243 to enter a track editing mode that allows further user inputs to specify the modifications to the corresponding object timeline representation, an attribute editing mode control 244 to enter an attribute editing mode that allows further user inputs to specify modifications to the attributes of the corresponding object track, and a delete control 241 to delete an object timeline representation. The timeline display area 230 also includes a new track control 235 that allows the user to create a new object timeline representation for a new object track.

In the track editing mode triggered by the track editing mode control 243, the user interface 200 displays an object timeline representation editing area 250 for the user to make modifications to one or more object timeline representations. The object timeline representation editing area 250 can display one or more track segments 257 specifying the timeline ranges of the image frames that have bounding box annotations for the object track, a seek cursor 258 specifying a frame number or time point, a split/select switch control 253 for switching between a split mode and a select mode, a merge track toggle control 254 for toggling on or off one or more merge track modifications made in the current session, a delete segment toggle control 255 for toggling on or off a track segment deletion made in the current session, and a confirm button 256 for confirming modifications made in a current session, and start a new session. The interface can receive user interactions via the various control elements in the timeline display area 230 and the object timeline representation editing area 250 to specify modifications to the object timeline representations. The object timeline representation editing area 250 further displays a submit button 252 that allows the user to submit the modifications to notify the system to update the object track data according to the updated object timeline representations as stored in the data buffer.

The key frame editing mode control 245 under each object timeline representation 240 can receive a user input to enter the key frame editing mode for the specific object timeline representation. The key frame editing mode allows a user to review and edit bounding boxes in the key frames. In the key frame editing mode, the interface can receive user inputs to select a bounding box, and to modify the currently selected bounding box. For example, the interface can receive a user input specifying a tract number to select or unselect a bounding box. The interface can display an inner tolerance box and an outer tolerance box of the selected bounding box to help a user determine whether the bounding box sufficiently bounds the detected object. The interface can receive user inputs that specify dragging the corner or edge of a bounding box to resize the bounding box, or dragging the interior of the bounding box to change its position.

The attribute editing mode control 244 under each object timeline representation 240 allows a user to enter the attribute editing mode for the specific object timeline representation. In the attribute editing mode, the interface receives user inputs to edit object attributes. The interface can provide object-level modifications for updating the attributes of all bounding boxes for an object track. For example, the interface can receive user input to specify an object type for an object tract from a list of object types, including options such as "passenger car", "police car", "pedestrian", "motorcyclist", "police motorcyclist", "ambulance", "fire truck", "cyclist", "open car door", "vehicle attachment", and so on. The system can associate the specified object type to all bounding boxes in the same object track. The interface can also provide frame-level modifications for updating the attributes of a bounding box in a key frame. For example, the interface can receive user input to specify an occlusion property for a bounding box in a specific key frame from a list of osculation property, including options such as "fully occluded" when the object is fully occluded by other objects in the image frame, "partially occluded" when the object is partially occluded by other objects in the image frame, and "not occluded" when the object is fully visible in the image frame. The bounding boxes in different key frames of a same object tract can have different occlusion properties.

In some implementations, as a built-in data check feature, the system only enables the submit button 252 after data verification has been performed for all existing object timeline representations. The data verification can include key frame verification and object attribute verification.

For reviewing and verifying the key frames of a specific object timeline representation, the user interface receives user inputs to select the object timeline representation in a key frame editing mode and scrub the timeline to check if all the bounding boxes are within error tolerance. For reviewing and verifying the object attributes of a specific object timeline representation, the user interface receives user inputs to enter the attribute editing mode for the object timeline representation to check if the object type, occlusion and any other attributes the bounding boxes are correct.

After each object timeline representations has been reviewed and verified under the key frame editing mode and the attribute editing mode, the system enables the submit button 252 to receive a submission command from the user to submit the modifications made to the object timeline representations, and makes modifications to the object data according to the submitted modifications.

Figure 3A:
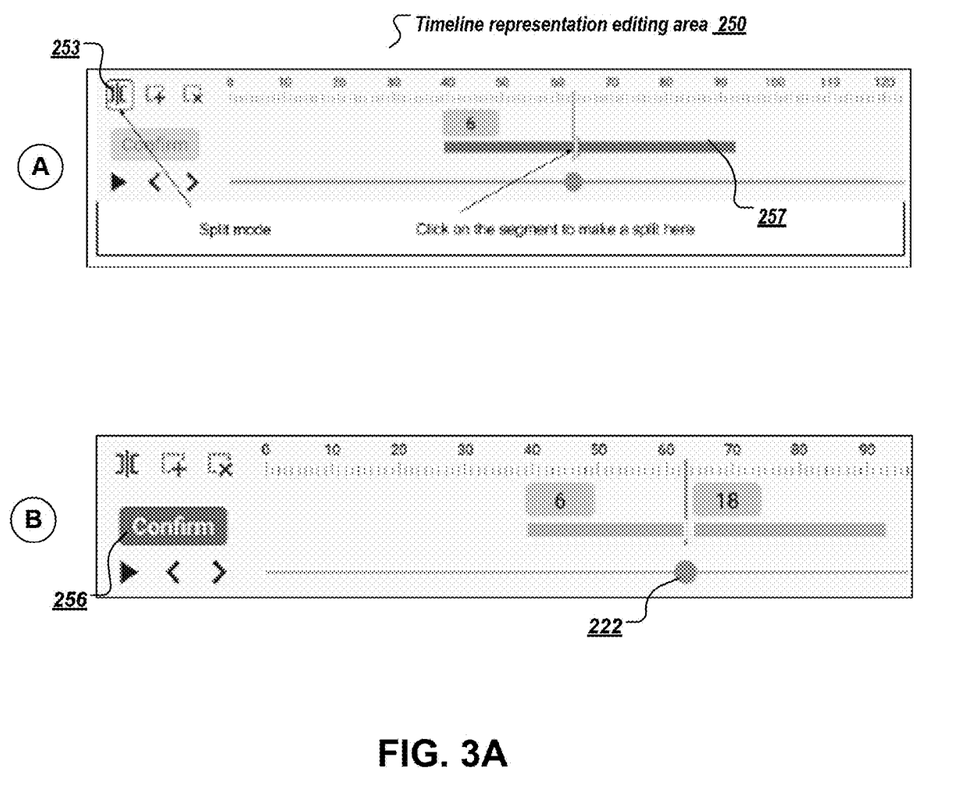
FIG. 3A shows an example of performing modifications to object timeline representations using the user interface.

FIG. 3A shows an example of splitting an object timeline representation using the interface 200 shown in FIG. 2. This type of modification is useful to correct errors in the object track data when two object tracks for two different objects are mistakenly characterized as a single object tract.

For splitting an object timeline representation, the interface receives a user input through the input device, e.g., a click on the track editing mode control 243 associated with the specified object timeline representation (e.g., the object timeline representation marked by track #6) to enter the editing mode for track #6.

In process (A), as shown in the top panel of FIG. 3A, the timeline representation editing area 250 displays a track segment 257 for the specified object timeline representation (#6). The interface receives a user input through the input device, e.g., a drag of the frame cursor control 222, to specify a split image frame. The split image frame is the image frame where the object timeline representation is to be split into two object timeline representations.

In process (B) as shown in the bottom panel of FIG. 3A, the interface receives a user input, e.g., a click on the timeline representation editing area 250, to indicate performing the split operation. The user interface performs the split operation by truncating the specified object timeline representation (#6) and assigning a new track number 18 for the track segment 257 removed from the specified object timeline representation. The system then receives a user input, e.g., a click on the confirm button 256 to confirm the changes made to object timeline representation #6 and object timeline representation #18, and enter a new session.

Figure 3B:
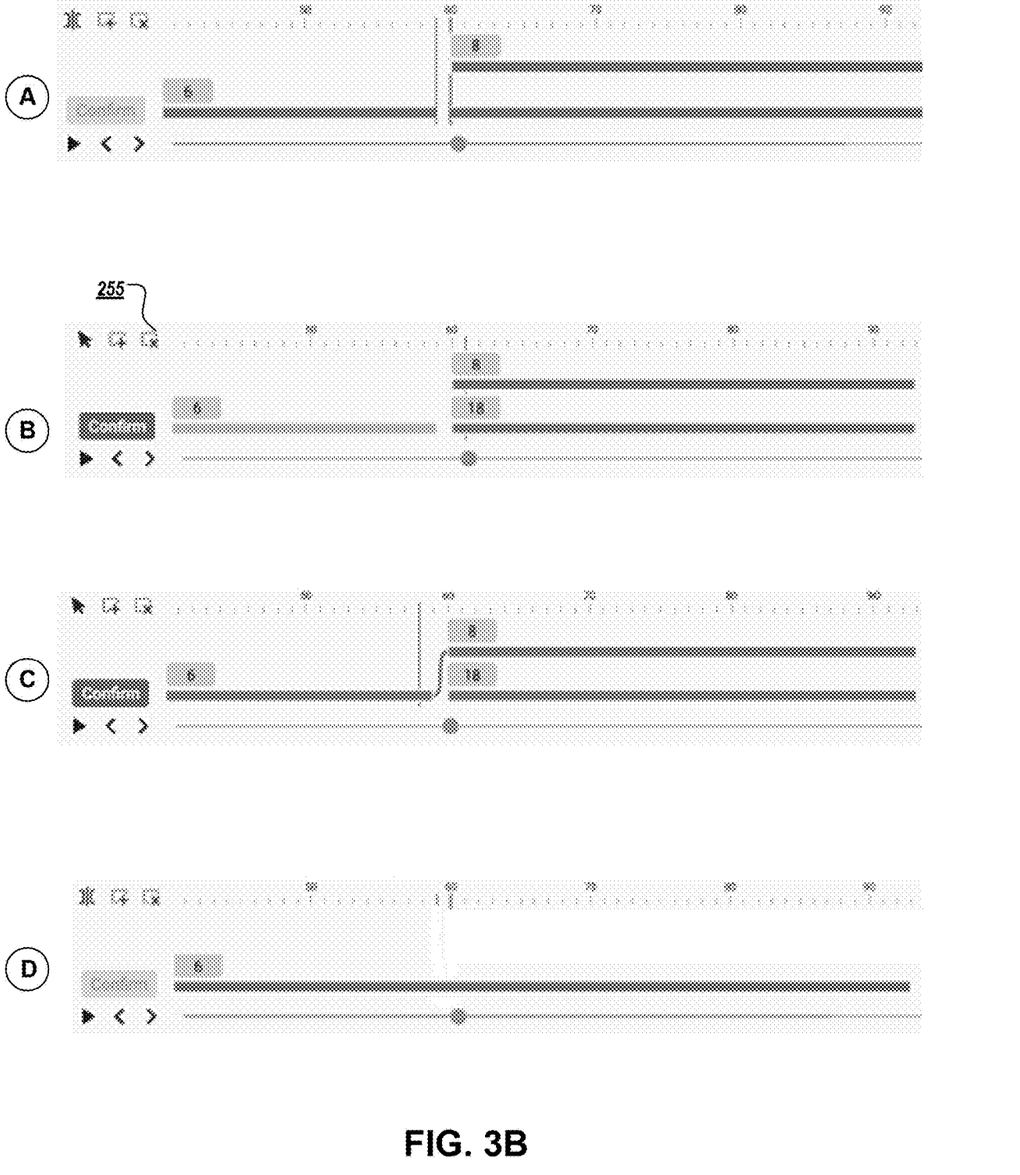
FIG. 3B shows another example of performing modifications to the object timeline representations using the user interface

FIG. 3B shows another example of performing modifications to object timeline representations using the interface 200 shown in FIG. 2. The modifications include splitting and trimming a first object timeline representation (e.g., track #6), and merging the trimmed first object timeline representation with a second object timeline representation (e.g., track #8). This type of modification is useful to correct errors in the object track data when an object track for a single object is mistakenly characterized as two different object tracks.

In order to make the modifications, the interface receives user inputs, for example, clicks on the track editing mode controls 243 associated with first object timeline representation and the second object timeline representation, that specify the object timeline representations to be modified (e.g., track #6 and track #8). In process (A), as shown in the top panel of FIG. 3B, the timeline representation editing area 250 displays the track segments for object timeline representation #6 and object timeline representation #8. The interface receives a user input of moving the frame cursor control 222 to specify the split image frame.

In process (B), as shown in the second panel from top of FIG. 3B, the interface receives a user input of clicking on the timeline representation editing area 250 to split track 6 into two segments (segment #6 and segment #18). The interface receives a user input of selecting segment #18 for deletion (e.g., via a clicking on segment #18 and clicking on the delete selection toggle control 255.

In process (C), as shown in the third panel from top of FIG. 3B, the interface merges segment #6 and segment #18. In some implementations, the system can make the merge in response to user inputs that specify the track segments to be merged and indicate a merge command. In some other implementations, the interface can be configured to automatically merge two non-overlapping track segments displayed in the object timeline representation editing area. For example, as shown in process (C) of FIG. 3B, the system can automatically merge segments #6 and #8 since they are now non-overlapping.

In certain implementations, when merging two tracks that both have frame-level attributes, the system can be configured to automatically reconcile an attribute transition. For example, when merging segment #6 and segment #18, if the last frame of segment #6 has a "NOT_OCCLUDED" attribute, and the first frame of segment #18 also has a "NOT_OCCLUDED" attribute, the system can auto-populate any frames between the last frame of segment #6 and the first frame of segment #18 as "NOT_OCCLUDED".

In process (D), as shown in the bottom panel of FIG. 3B, the interface receives a user input to confirm the edits (e.g., via clicking on the confirm button 256), and saves the changes to the updated object timeline representation track #6, now including the merged segments #6 and #18. In some implementations, once the edits are confirmed in a current edit session, the system can start a new edit session.

Figure 4:
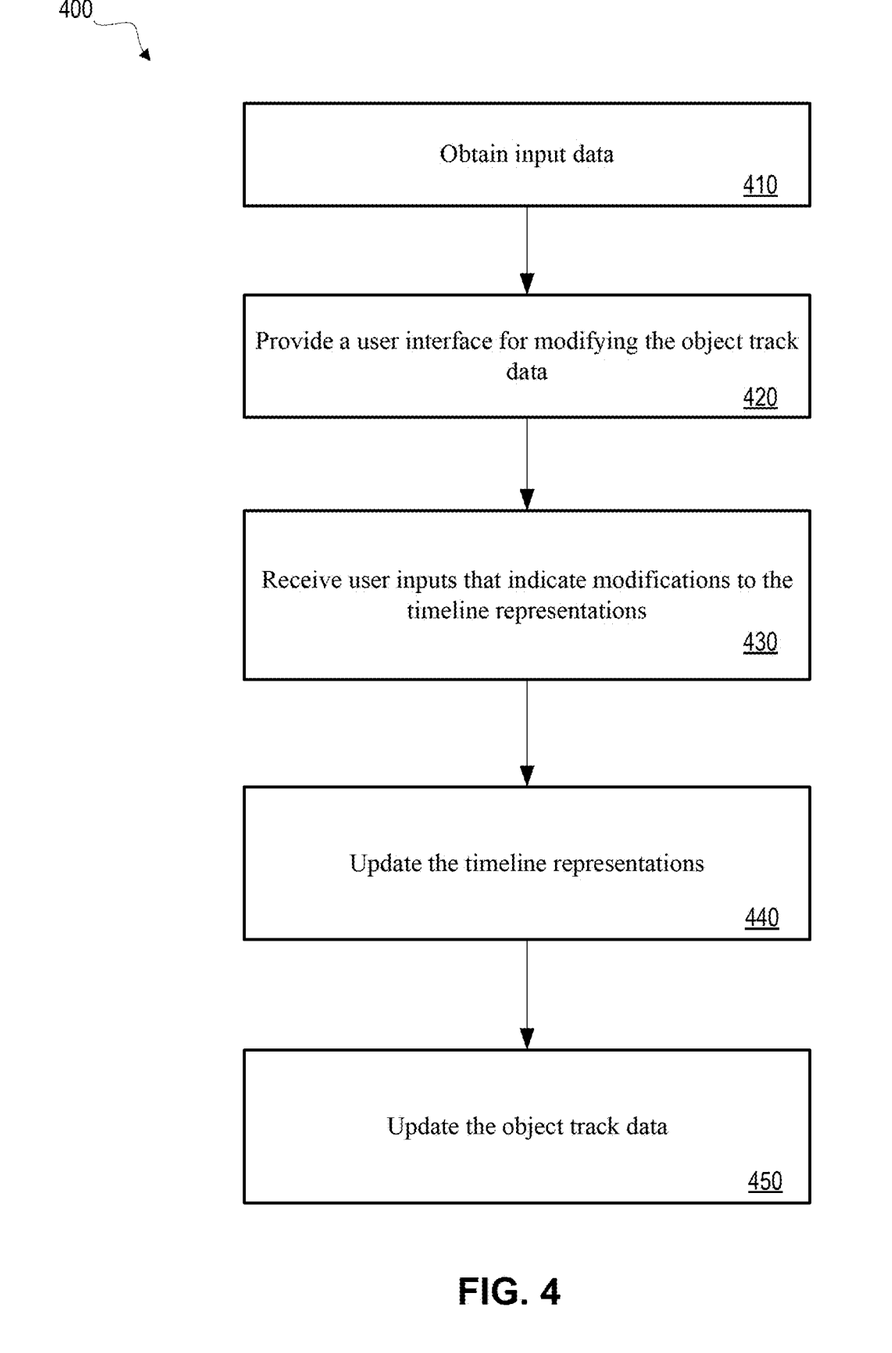
FIG. 4 is a flow diagram illustrating an example process for editing object labels in video data.

FIG. 4 is a flow diagram illustrating an example process 400 for editing object labels in video data. For convenience, the process 400 will be described as being performed by a system of one or more computers located in one or more locations. For example, an annotation editing system, e.g., the annotation editing system 120 of FIG. 1, appropriately programmed in accordance with this specification, can perform the process 400.

In step 410, the system obtains input data. The input data includes a video segment including multiple image frames associated with multiple time points, and object track data specifying a set of object tracks. The object track data specifies a set of object tracks. Each object track corresponds to a different object detected in the video segment. The object track data for each object track includes one or more bounding boxes marking the corresponding detected object in one or more of the multiple image frames. Each bounding box marks a position and size of the detected object.

In an example, the video segment is generated by vehicle sensors (e.g., a camera mounted on a vehicle). The object tract data is first generated by a computer-implemented automatic annotation generation module, such as the module 130 in FIG. 1. The system 120 receives the automatically generated object tract data and the video segment in step 410.

In some implementations, the object track data for an object track further includes attributes of the detected object. The attributes can include object-level properties, such as the type of objects, including options such as "passenger car", "police car", "pedestrian", "motorcyclist", "police motorcyclist", "ambulance", "fire truck", "cyclist", "open car door", "vehicle attachment". Further examples of object-level attributes include road sign color and road sign shape.

The attributes can also include frame-level properties, such as the occlusion property of the detected object in a specific frame, including options such as "fully occluded" when the object is fully occluded by other objects in the image frame, "partially occluded" when the object is partially occluded by other objects in the image frame, and "not occluded" when the object is fully visible in the image frame. Further examples of frame-level attributes include a status of traffic signal, e.g., whether a specific traffic light is on or off.

In some implementations, only a subset of image frames of the video segment are annotated with bounding boxes in the object tract data. This subset of image frames are termed key frames. The system can generate annotations for the non-key image frames based on the key frames using interpolation or another prediction or approximation method. Thus, a user, such as a labeler, does not have to enter the bounding boxes for every frame of every object in the video segment for generating or editing the object tract data.

In step 420, the system provides a user interface for modifying the object track data. The system can output the user interface to a display device that displays the user interface as a graphical user interface (GUI). The user interface includes a video display area that displays one or more image frames of the video segment annotated with any bounding boxes specified in the object track data. The user interface further includes a timeline display area that displays, for each of one or more of the object tracks, an object timeline representation of the object track that identifies the image frames in which the corresponding detected object is marked with a bounding box.

In step 430, the system receives user inputs that indicate one or more modifications to the object timeline representations. The system includes an interface I/O control that receives and recognizes user interactions with the user interface to allow the user to make modifications to one or more object timeline representations. The modifications made to an object timeline representation specify modifications to the corresponding object tract, and include, for example, splitting an object track, trimming an object track, merging multiple object tracks, splitting and swapping sections of multiple object tracks.

In step 440, the system updates the object timeline representations displayed in the timeline display area in response to receiving the user indicated modifications. The user indicated modifications include, for example, splitting an object timeline representation, trimming an object timeline representation, merging multiple object timeline representations, and splitting and swapping sections of multiple object timeline representations. The system updates the object timeline representations according to the received user indication for modifications.

For example, for splitting an object timeline representation, the user inputs specify an object timeline representation and a split image frame. The split image frame is the image frame where the object timeline representation is to be split into two object timeline representations. In response to receiving the user inputs, the system modifies the specified object timeline representation by removing any bounding boxes in the key frames after the split image frame, and generates a new object timeline representation for a new object track that includes the bounding boxes that were removed from the specified object timeline representation. The system also displays the new object timeline representation in the timeline display area.

For trimming an object timeline representation, the user inputs specify an object timeline representation, one or more split image frames, and a track segment for deletion. In response to receiving the user inputs, the system splits, according to the one or more split image frames, the specified object timeline representations into two or more track segments, and removes bounding boxes corresponding to the track segment selected for deletion.

For merging two object timeline representations, the user inputs specify a first object timeline representation and a second object timeline representation. In response to receiving the user inputs, the system modifies the first specified object timeline representation by inserting any bounding boxes of the second specified object timeline representation, and removes the second specified object timeline representation. In some implementations, the interface 200 can be configured to automatically merge two non-overlapping track segments displayed in the object timeline representation editing area.

For splitting and swapping sections of two object timeline representations, the user inputs specify a first object timeline representation, a second object timeline representation, and a split image frame. In response to receiving the user inputs, the system splits the first object timeline representation at the split image frame into a first and a third track segments, splits the second object timeline representation at the split image frame into a second and a fourth track segments, merges the first and the fourth track segments to form the updated first object timeline representation, and merges the second and the third track segments to form the updated second object timeline representation.

In step 450, the system updates the object track data according to the updated object timeline representation. For example, after a specific object timeline representation has been trimmed, the system can modify the corresponding object track in the object track data by removing, from the corresponding object track, the bounding boxes that have been removed from the object timeline representation. Similarly, after a first and a second object timeline representations have been merged, the system can modify the object tract corresponding to the first object timeline representation by inserting, into the object tract corresponding to the first object timeline representation, the bounding boxes that have been inserted to the first object timeline representation by the merging operation, and remove the object track corresponding to the second object timeline representation from the object tract data.

In some implementations, the system includes a data buffer that stores the modifications made to the object timeline representations. The data buffer provides the flexibility of toggling on and off modifications made to the object timeline representations in a current session, and confirming and verifying the modifications before updating the object track data. The system can receive a user input that indicates a submission command, and update the object track data according to the updated object timeline representation in response to receiving the submission command In some implementations, as a built-in data check feature, the system only enables the submission command after data verification has been performed for all existing object timeline representations. The data verification can include key frame verification and object attribute verification. For reviewing and verifying the key frames of a specific object timeline representation, the user interface receives user inputs to select the object timeline representation in a key frame editing mode and scrub the timeline to verify all the bounding boxes are within tolerance. For reviewing and verifying the object attributes of a specific object timeline representation, the user interface receives user inputs to enter an attribute editing mode for the object timeline representation to verify the object type, occlusion and any other attributes the question presents.

After the key frames and object attributes of all object timeline representations have been reviewed and verified, the system enables the user to submit the modifications made to the object timeline representations, and updates the object tracks accordingly. The update to the object tracks include generating new object tracks, removing object tracks, trimming object tracks, merging object tracks, modifying the bounding boxes in object tracks, and/or modifying the object attributes.

This specification uses the term "configured" in connection with systems and computer program components. For a system of one or more computers to be configured to perform particular operations or actions means that the system has installed software, firmware, hardware, or a combination of them that cause the system to perform the operations or actions. For one or more computer programs to be configured to perform particular operations or actions means that the one or more programs include instructions that, when executed by a data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
   obtaining a video segment comprising multiple image frames associated with multiple time points;
   obtaining object track data specifying a set of object tracks, each object track corresponding to a different detected object;
   providing, for presentation to a user, a user interface for modifying the object track data, the user interface comprising:
      a video display area that displays one or more image frames from the video segment annotated with any object labels specified in the object track data; and
      a timeline display area that displays, for each of one or more of the object tracks, a respective object timeline representation of the respective object track that identifies the image frames in which the corresponding detected object is marked with an object label;
   receiving one or more user inputs, wherein the one or more user inputs comprise a first input specifying a split image frame within a first object timeline representation;
   in response to receiving the one or more user inputs, updating the object timeline representations displayed in the timeline display area, the updating comprising:
      modifying the first object timeline representation by removing any object labels in image frames after the split image frame;
      generating a new object timeline representation for a new object track that includes the object labels that were removed from the first object timeline representation; and
      displaying the new object timeline representation in the timeline display area; and
   updating the object track data according to the updated object timeline representations.

2. The method of claim 1, wherein each of the one or more object labels includes a bounding box or a set of key points for marking the position and the geometry of the corresponding detected object.

3. The method of claim 1, wherein:
   the one or more user inputs include user inputs specifying a second object timeline representation and a third object timeline representation; and
   updating the object timeline representations comprises:
      modifying the second specified object timeline representation by inserting any object labels in the third specified object timeline representation; and
      removing the third specified object timeline representation.

4. The method of claim 1, wherein:
the one or more user inputs include user inputs specifying an object timeline representation, one or more split image frames within the object timeline representation, and a segment of the object timeline representation to be deleted, the segment of the object timeline representation being defined by one or two of the split image frames; and
updating the object timeline representations comprises:
modifying the specified object timeline representation by removing any object labels in the segment of the object timeline representation.

5. The method of claim 1, wherein:
the one or more user inputs include user inputs specifying an object timeline representation to be deleted; and
updating the object timeline representations comprises:
removing the object timeline representation to be deleted from the timeline display area.

6. The method of claim 1, wherein:
the one or more user inputs include user inputs specifying one or more object labels for a new object timeline representation; and
updating the object timeline representations comprises:
generating the new object timeline representation and inserting the specified one or more object labels.

7. The method of claim 1, further comprising:
with each object timeline representation displayed in the timeline display area, displaying an object track number associated with the corresponding object track; and
with each object label displayed in the video display area, displaying the object track number associated with the corresponding object track.

8. The method of claim 1, further comprising:
storing, in a data buffer, modifications made on an object timeline representation in a current session;
presenting an option in the user interface to toggle on or off the modifications made in a current editing session;
in response to receiving a user input to toggle off the modifications made in the current editing session, reversing one or more modifications made on the object timeline representation in the current editing session; and
in response to receiving a user input to toggle on the modifications in the current editing session, restoring, using data stored in the data buffer, one or more modifications made on the object timeline representation in the current editing session.

9. The method of claim 8, further comprising:
presenting an option in the user interface to confirm the modifications made in the current editing session; and
in response to receiving a user input to confirm the modifications, ending the current editing session and starting a new editing session.

10. The method of claim 1, further comprising:
presenting an option in the user interface to submit modifications made to the object timeline representations; and
initiating updating the object track data in response to receiving a user input to submit the modifications made to the object timeline representations.

11. The method of claim 1, wherein:
the object labels specified in the set of object tracks are in a subset of image frames of the multiple image frames of the video segment.

12. The method of claim 11, further including:
performing inter-frame interpolations, based on the object labels in the subset of image frames, to generate additional object labels in image frames not in the subset of image frames.

13. The method of claim 1, wherein obtaining the object track data specifying the set of object tracks comprises:
generating the set of object tracks by processing the video segment using a machine-learning model.

14. A system comprising:
one or more computers; and
one or more storage devices storing instructions that when executed by the one or more computers, cause the one or more computers to perform:
obtaining a video segment comprising multiple image frames associated with multiple time points;
obtaining object track data specifying a set of object tracks, each object track corresponding to a different detected object;
providing, for presentation to a user, a user interface for modifying the object track data, the user interface comprising:
a video display area that displays one or more image frames from the video segment annotated with any object labels specified in the object track data; and
a timeline display area that displays, for each of one or more of the object tracks, a respective object timeline representation of the respective object track that identifies the image frames in which the corresponding detected object is marked with an object label;
receiving one or more user inputs, wherein the one or more user inputs comprise a first input specifying a split image frame within a first object timeline representation;
in response to receiving the one or more user inputs, updating the object timeline representations displayed in the timeline display area, the updating comprising:
modifying the first object timeline representation by removing any object labels in image frames after the split image frame;
generating a new object timeline representation for a new object track that includes the object labels that were removed from the object timeline representation; and
displaying the new object timeline representation in the timeline display area; and
updating the object track data according to the updated object timeline representations.

15. The system of claim 14, wherein:
the one or more user inputs include user inputs specifying a second object timeline representation and a third object timeline representation; and
the instructions stored in the one or more storage devices, when executed by the one or more computers, cause the one or more computers to further perform:
modifying the second specified object timeline representation by inserting any object labels in the third specified object timeline representation; and
removing the third specified object timeline representation.

16. The system of claim 14, wherein:
the one or more user inputs include user inputs specifying an object timeline representation, one or more split image frames within the object timeline representation, and a segment of the object timeline representation to be deleted, the segment of the object timeline representation being defined by one or two of the split image frames; and the instructions stored in the one or more storage devices, when executed by the one or more computers, cause the one or more computers to further perform:
modifying the specified object timeline representation by removing any object labels in the segment of the object timeline representation.

17. One or more non-transitory computer-readable storage media storing instructions that, when executed by one or more computers, cause the one or more computers to perform:
obtaining a video segment comprising multiple image frames associated with multiple time points;
obtaining object track data specifying a set of object tracks, each object track corresponding to a different detected object;
providing, for presentation to a user, a user interface for modifying the object track data, the user interface comprising:
a video display area that displays one or more image frames from the video segment annotated with any object labels specified in the object track data; and
a timeline display area that displays, for each of one or more of the object tracks, a respective object timeline representation of the respective object track that identifies the image frames in which the corresponding detected object is marked with an object label;
receiving one or more user inputs, wherein the one or more user inputs comprise a first input specifying a split image frame within a first object timeline representation;
in response to receiving the one or more user inputs, updating the object timeline representations displayed in the timeline display area, the updating comprising:
modifying the first object timeline representation by removing any object labels in image frames after the split image frame;
generating a new object timeline representation for a new object track that includes the object labels that were removed from the first object timeline representation; and
displaying the new object timeline representation in the timeline display area; and
updating the object track data according to the updated object timeline representations.

18. The one or more non-transitory computer-readable storage media of claim 17, wherein:
the one or more user inputs include user inputs specifying an object timeline representation and a split image frame within the object timeline representation; and
the instructions stored in the one or more computer-readable storage media, when executed by the one or more computers, cause the one or more computers to further perform:
modifying the specified object timeline representation by removing any object labels in image frames after the split image frame;
generating a new object timeline representation for a new object track that includes the object labels that were removed from the specified object timeline representation; and
displaying the new object timeline representation in the timeline display area.

* * * * *